United States Patent
Braun et al.

(10) Patent No.: US 11,951,719 B2
(45) Date of Patent: Apr. 9, 2024

(54) SUPPORT CARRIER MATERIAL WITH A MODIFIED RESIN LAYER, AND THE PRODUCTION THEREOF

(71) Applicant: SWISS KRONO Tec AG, Lucerne (CH)

(72) Inventors: Roger Braun, Willisau (CH); Andreas Gier, Mandelbachtal (DE); Dorin Moisch, Littau (CH); Pius Steinmann, Menznau (CH)

(73) Assignee: SWISS KRONO Tec AG, Lucerne (CH)

( * ) Notice: Subject to any disclaimer, the term of this patent is extended or adjusted under 35 U.S.C. 154(b) by 653 days.

(21) Appl. No.: 16/092,549

(22) PCT Filed: Nov. 30, 2016

(86) PCT No.: PCT/EP2016/079282
§ 371 (c)(1),
(2) Date: Oct. 10, 2018

(87) PCT Pub. No.: WO2017/178083
PCT Pub. Date: Oct. 19, 2017

(65) Prior Publication Data
US 2019/0126600 A1    May 2, 2019

(30) Foreign Application Priority Data
Apr. 12, 2016 (EP) .................................... 16164881

(51) Int. Cl.
*B32B 13/00* (2006.01)
*B27N 7/00* (2006.01)
(Continued)

(52) U.S. Cl.
CPC .............. *B32B 27/10* (2013.01); *B27N 7/005* (2013.01); *B32B 13/00* (2013.01); *B32B 13/04* (2013.01);
(Continued)

(58) Field of Classification Search
CPC ......... B32B 27/10; B32B 27/40; B32B 21/00; B32B 21/08; B32B 19/00; B32B 21/02;
(Continued)

(56) References Cited

U.S. PATENT DOCUMENTS 3,909,343 A * 9/1975 Posselt ..................... D21J 1/16
100/215
3,983,307 A * 9/1976 Power .................... D21H 27/26
156/278
(Continued)

FOREIGN PATENT DOCUMENTS

CN    103210051 A    7/2013
CN    103818057 A    5/2014
(Continued)

OTHER PUBLICATIONS

"Epoxy Resins" in Encyclopedia of Polymer Science and Technology 3rd ed., by Ha Q. Pham and Maurice J. Marks, Dow Chemical, Freeport, TX; 10.1002/0471440264.pst119 (Year: 2012).*
(Continued)

*Primary Examiner* — Michael C Romanowski
(74) *Attorney, Agent, or Firm* — The Webb Law Firm

(57) ABSTRACT

A carrier material has a resin layer arranged on a side of the carrier material. The resin layer includes a formaldehyde resin, a polymer selected from a group containing polyacrylates, polyepoxides, polyesters, polyurethanes, and long-chain silanols, and at least one silane-containing compound of general formula (I), $R_a SiX_{(4-a)}$, and/or the hydrolysis product thereof, where X is H, OH, or a hydrolyzable (Continued)

residue selected from the group comprising halogen, alkoxy, carboxy, amino, monoalkylamino or dialkylamino, aryloxy, acyloxy, alkylcarbonyl; R is a non-hydrolyzable organic residue R selected from the group comprising alkyl, aryl, alkenyl, substituted and unsubstituted alkynyl, cycloalkyl, which can be interrupted by —O— or —NH—; and where R can have a functional group Q selected from a group containing a hydroxy, ether, amino, monoalkylamino, dialkylamino, anilino, amide, carboxy, mercapto, alkoxy, aldehyde, alkylcarbonyl, epoxide, alkenyl, alkynyl, acryl, acryloxy, methacryl, methacryloxy, cyano, and isocyano group, and a is 0-3.

21 Claims, 2 Drawing Sheets

(51) Int. Cl.
| | |
|---|---|
| B32B 13/04 | (2006.01) |
| B32B 13/12 | (2006.01) |
| B32B 19/00 | (2006.01) |
| B32B 19/04 | (2006.01) |
| B32B 21/00 | (2006.01) |
| B32B 21/02 | (2006.01) |
| B32B 21/04 | (2006.01) |
| B32B 21/08 | (2006.01) |
| B32B 21/14 | (2006.01) |
| B32B 27/00 | (2006.01) |
| B32B 27/06 | (2006.01) |
| B32B 27/08 | (2006.01) |
| B32B 27/10 | (2006.01) |
| B32B 27/18 | (2006.01) |
| B32B 27/28 | (2006.01) |
| B32B 27/30 | (2006.01) |
| B32B 27/36 | (2006.01) |
| B32B 27/38 | (2006.01) |
| B32B 27/40 | (2006.01) |
| B32B 27/42 | (2006.01) |
| B32B 29/00 | (2006.01) |
| C09D 133/08 | (2006.01) |
| C09D 163/00 | (2006.01) |
| C09D 167/00 | (2006.01) |
| C09D 201/00 | (2006.01) |
| C09J 161/28 | (2006.01) |
| D21H 19/00 | (2006.01) |
| B27N 3/18 | (2006.01) |
| C08K 3/22 | (2006.01) |
| C08L 61/24 | (2006.01) |
| C08L 61/28 | (2006.01) |
| C08L 61/30 | (2006.01) |

(52) U.S. Cl.
CPC .............. *B32B 13/12* (2013.01); *B32B 19/00* (2013.01); *B32B 19/04* (2013.01); *B32B 21/00* (2013.01); *B32B 21/02* (2013.01); *B32B 21/04* (2013.01); *B32B 21/08* (2013.01); *B32B 21/14* (2013.01); *B32B 27/00* (2013.01); *B32B 27/06* (2013.01); *B32B 27/08* (2013.01); *B32B 27/18* (2013.01); *B32B 27/28* (2013.01); *B32B 27/30* (2013.01); *B32B 27/308* (2013.01); *B32B 27/36* (2013.01); *B32B 27/38* (2013.01); *B32B 27/40* (2013.01); *B32B 27/42* (2013.01); *B32B 29/00* (2013.01); *C09D 133/08* (2013.01); *C09D 163/00* (2013.01); *C09D 167/00* (2013.01); *C09D 201/00* (2013.01); *C09J 161/28* (2013.01); *D21H 19/00* (2013.01); *B27N 3/18* (2013.01); *B32B 2250/00* (2013.01); *B32B 2262/00* (2013.01); *B32B 2262/067* (2013.01); *B32B 2264/00* (2013.01); *B32B 2264/10* (2013.01); *B32B 2307/00* (2013.01); *B32B 2307/10* (2013.01); *B32B 2307/30* (2013.01); *B32B 2307/536* (2013.01); *B32B 2307/554* (2013.01); *B32B 2307/558* (2013.01); *B32B 2307/712* (2013.01); *B32B 2361/00* (2013.01); *B32B 2363/00* (2013.01); *B32B 2419/00* (2013.01); *B32B 2419/04* (2013.01); *B32B 2451/00* (2013.01); *B32B 2471/00* (2013.01); *B32B 2479/00* (2013.01); *B32B 2554/00* (2013.01); *B32B 2607/00* (2013.01); *B32B 2607/02* (2013.01); *C08K 2003/2227* (2013.01); *C08K 2201/011* (2013.01); *C08L 61/24* (2013.01); *C08L 61/28* (2013.01); *C08L 61/30* (2013.01)

(58) Field of Classification Search
CPC ......... B32B 27/06; B32B 21/14; B32B 27/28; B32B 13/12; B32B 29/00; B32B 19/04; B32B 13/00; B32B 21/04; B32B 27/308; B32B 27/08; B32B 13/04; B32B 27/00; B32B 27/18; B32B 27/30; B32B 27/36; B32B 27/38; B32B 27/42; B32B 2262/00; B32B 2479/00; B32B 2307/558; B32B 2307/10; B32B 2250/00; B32B 2307/554; B32B 2307/712; B32B 2307/00; B32B 2471/00; B32B 2264/00; B32B 2607/00; B32B 2307/30; B32B 2307/536; B32B 2262/067; B32B 2264/10; B32B 2419/00; B32B 2607/02; B32B 2361/00; B32B 2363/00; B32B 2419/04; B32B 2554/00; B32B 2451/00; C09D 163/00; C09D 201/00; C09D 167/00; C09D 133/08; C09D 161/28; D21H 19/00; D21H 17/37; D21H 17/47; D21H 17/49–51; B27N 7/005; B27N 3/18; C08L 61/24; C08L 61/30; C08L 61/28; C08K 2003/2227; C08K 2201/011; B44C 5/043; B44C 5/0469; B44C 5/0492
USPC ......... 428/402, 423.1, 195.1, 220, 354, 219, 428/323, 36.9, 425.1, 447, 221, 355 AC, 428/413, 522, 688, 141, 172, 212, 215, 428/304.4, 327, 339, 425.8, 454, 523, 428/532, 106, 116, 174, 203, 218, 313.3, 428/313.9, 314.4, 317.3, 317.9, 336, 35.8, 428/372, 375, 403, 411.1, 412, 414, 448, 428/451, 457, 474.4, 537.5, 541, 704, 428/105, 107, 117, 143, 160, 188, 196, 428/201, 205, 292.1, 294.7, 300.1, 301.4, 428/305.5, 312.6, 316.6, 317.5, 317.7, 428/319.3, 319.7, 320.2, 325, 328, 331, 428/332, 335, 340, 341, 342, 34.1, 34.4, 428/34.6, 355 BL, 355 EN, 355 R, 35.7, 428/364, 36.91, 370, 405, 407, 418, 41.8, 428/422, 423.5, 426, 428, 446, 450, 452, 428/461, 462, 463, 473, 478.2, 479.3, 428/480, 483, 485, 500, 507, 521, 533, 428/537.1, 95, 96, 98, 34.2
See application file for complete search history.

(56) References Cited

U.S. PATENT DOCUMENTS

| | | | | |
|---|---|---|---|---|
| 4,109,043 A * | 8/1978 | DeLapp | ............... | D21H 17/57 |
| | | | | 428/206 |
| 4,880,689 A * | 11/1989 | Park | ............... | D21H 27/28 |
| | | | | 428/404 |
| 5,059,264 A * | 10/1991 | Sheets | ............... | B27N 7/005 |
| | | | | 427/393 |
| 5,288,540 A * | 2/1994 | Albrinck | ............... | B32B 29/002 |
| | | | | 428/447 |
| 5,306,783 A * | 4/1994 | Kirchgaessner | ............... | B32B 21/06 |
| | | | | 528/254 |
| 5,466,511 A * | 11/1995 | O'Dell | ............... | B44F 1/14 |
| | | | | 428/327 |
| 8,678,133 B2 | 3/2014 | Clausi et al. | | |
| 2002/0054994 A1* | 5/2002 | Dupre | ............... | C08L 61/06 |
| | | | | 428/349 |
| 2003/0112311 A1* | 6/2003 | Naik | ............... | B32B 7/12 |
| | | | | 347/105 |
| 2003/0138600 A1* | 7/2003 | Dohring | ............... | D21H 27/22 |
| | | | | 162/158 |
| 2007/0231583 A1* | 10/2007 | Ilzuka | ............... | B32B 27/10 |
| | | | | 428/411.1 |
| 2008/0142436 A1* | 6/2008 | Bothe | ............... | C09D 133/04 |
| | | | | 428/479.6 |
| 2008/0199666 A1* | 8/2008 | Price | ............... | D06M 15/263 |
| | | | | 156/349 |
| 2008/0199672 A1* | 8/2008 | Ruhdorfer | ............... | B32B 21/02 |
| | | | | 428/537.1 |
| 2008/0263985 A1* | 10/2008 | Hasch | ............... | B44C 5/043 |
| | | | | 52/506.01 |
| 2009/0272505 A1* | 11/2009 | Champ | ............... | D21H 19/66 |
| | | | | 162/134 |
| 2010/0087577 A1* | 4/2010 | Didavide | ............... | D21H 27/28 |
| | | | | 524/262 |
| 2010/0092731 A1* | 4/2010 | Pervan | ............... | E04C 2/16 |
| | | | | 118/200 |
| 2011/0091735 A1* | 4/2011 | Luc | ............... | B32B 7/14 |
| | | | | 156/60 |
| 2011/0217463 A1 | 9/2011 | Oldorff | | |
| 2012/0034441 A1* | 2/2012 | Adzima | ............... | C04B 14/42 |
| | | | | 428/219 |
| 2013/0331484 A1 | 12/2013 | Braum et al. | | |
| 2014/0186610 A1* | 7/2014 | Pervan | ............... | B32B 21/06 |
| | | | | 428/292.4 |
| 2014/0199558 A1* | 7/2014 | Pervan | ............... | B32B 37/18 |
| | | | | 428/530 |
| 2014/0272340 A1* | 9/2014 | Beck | ............... | B32B 21/02 |
| | | | | 428/220 |
| 2015/0083319 A1* | 3/2015 | Persson | ............... | D21H 17/74 |
| | | | | 427/382 |
| 2015/0111055 A1* | 4/2015 | Persson | ............... | B32B 27/10 |
| | | | | 156/62.2 |
| 2016/0009114 A1* | 1/2016 | Leifert | ............... | D21H 27/18 |
| | | | | 428/32.37 |
| 2016/0051112 A1* | 2/2016 | Schade | ............... | B05D 1/28 |
| | | | | 15/104.93 |
| 2016/0214395 A1* | 7/2016 | Torfs | ............... | C09D 11/324 |
| 2016/0257844 A1* | 9/2016 | Geyer | ............... | C09D 161/32 |

FOREIGN PATENT DOCUMENTS

| | | | | |
|---|---|---|---|---|
| CN | 103950057 A | | 7/2014 | |
| DE | WO2014206802 A1 | * | 12/2014 | ............ B32B 21/08 |
| EP | 0519242 A1 | | 12/1992 | |
| EP | 2251501 A1 | | 11/2010 | |
| EP | 2272668 A1 | | 1/2011 | |
| EP | 2338693 A1 | | 6/2011 | |
| EP | 2447332 A1 | | 5/2012 | |
| EP | 2873523 A1 | | 5/2015 | |
| JP | 2009233958 | * | 10/2009 | ............ B32B 27/10 |
| WO | 2010088769 A1 | | 8/2010 | |
| WO | 2011082491 A1 | | 7/2011 | |

OTHER PUBLICATIONS

"Melamine-formaldehyde Resins", Polymer Properties Database https://web.archive.org/web/20160425163539/http://polymerdatabase.com/polymer%20classes/MelamineFormaldehyde%20type.html, 2015 (Year: 2015).*

Andrew Jacobs, "What is Kraft Paper and What Makes it So Popular", JAM® Paper and Envelope, Sep. 9, 2013, https://www.jampaper.com/blog/what-is-kraft-paper/ (Year: 2013).*

"Luxury Vinyl Tiles", Plyquet Group, 2017, Retrieved from http://www.plyquet.net/luxury-vinyl-tiles.html.

"SilentTouch", PurChem, 2015, Retrieved from http://purchem.com/laminated-flooring.html.

* cited by examiner

SUPPORT CARRIER MATERIAL WITH A MODIFIED RESIN LAYER, AND THE PRODUCTION THEREOF

CROSS-REFERENCE TO RELATED APPLICATIONS

This application is the United States national phase of International Application No. PCT/EP2016/079282 filed Nov. 30, 2016, and claims priority to European Patent Application No. 16164881.1 filed Apr. 12, 2016, the disclosures of which are hereby incorporated in their entirety by reference.

BACKGROUND OF THE INVENTION

Field of the Invention

The present invention relates to a support material provided with a resin layer, to a flexible laminate comprising such a support material, to a process for the production of such a laminate, and to a sheet comprising such a laminate.

Description of Related Art

The annual quantity of wood-based sheets currently produced and sold worldwide, in particular in the form of laminate floors or else wall panels, is several hundred million square meters. The success of, and the high acceptance level of, these wood-based sheets is based mainly on their good property profile and on the possibility of providing realistic imitations of natural surfaces, in particular of wood floors.

These wood-based sheets usually have a surface consisting of a hardened synthetic resin. In particular, melamine-coated surfaces are among the most frequently encountered surfaces in the industrial floor and furniture sector.

In particular, wood-based sheets that can be used in the interior sector can have many different decorative effects, e.g. the appearance of stone or of wood. These decorative effects are applied onto the corresponding support sheets by using suitable decorative papers or else increasingly by direct printing.

Another objective increasingly adopted, alongside visual imitation, is tactile imitation. In the field of decorative wood effects, by way of example, an appropriate tactile wood effect, pleasantly warm and soft, is desirable. In the case of stone structures, in contrast, a desirable tactile effect providing a realistic imitation of a natural surface is cold and hard.

One approach for the improvement or appropriate modification of tactile properties consists in the incorporation of fillers, e.g. cellulose fibers or hollow spheres, into the melamine-resin-containing surfaces. Other known solutions are melamine-free polymer coatings. However, these have inferior usage properties and processing properties, and are more expensive and have not achieved the same acceptance level.

Other approaches to the improvement of tactile properties comprise the use of flexible laminates which are applied onto the support sheets, for example by lamination. Highly flexible laminates have particular suitability for the production of modern furniture components, floors and other surfaces, because they provide realistic visual and tactile imitations of natural surfaces. These laminates have the advantage that in comparison with materials that are somewhat "rigid and brittle" they are soft and resilient to the touch and are perceived as "warmer" than conventional laminates. The term laminate here means a layer material that can be applied (e.g. via lamination) onto a support sheet. Another important aspect is acoustic properties, in particular for the use as floor. The prior art currently discloses, for example, flexible laminates in which the layer composite includes a resilient film, e.g. TPU film.

Another approach for obtaining flexible surfaces is represented by what are known as LVT (luxury vinyl tiles). However, these have the disadvantage of containing PVC; in some applications this is not tolerated, or is tolerated only to a restricted extent, for example because of plasticizers.

Accordingly, there is a continuing requirement for suitable solutions for appropriate modification of tactile properties and other surface properties to provide realistic imitations of the corresponding natural surfaces.

The invention is therefore based on technical object of applying, onto a floor panel or onto a furniture surface, a surface that is resilient and robust and that provides a realistic imitation of a natural surface. Realistic imitations of natural surfaces include by way of example the following features: appearance, tactile properties, thermal conductivity, hardness, surface structure, acoustic properties, impact resistance.

SUMMARY OF THE INVENTION

Said object is achieved in the invention via a support material with the features described herein and a flexible laminate with the features described herein.

Accordingly a support material is provided with at least one resin layer provided on at least one of the sides of the support material, where the at least one resin layer comprises a modified resin made of
  at least one formaldehyde resin,
  at least one polymer selected from a group containing polyacrylates, polyepoxides, polyesters, polyurethanes and long-chain silanols, and
  at least one silane-containing compound of the general formula $$R_a SiX_{(4-a)}$$

and/or hydrolysis product thereof, where
  X is H, OH or a hydrolysable moiety selected from the group containing halogen, alkoxy, carboxy, amino, monoalkylamino, dialkylamino, aryloxy, acyloxy, alkylcarbonyl,
  R is a non-hydrolysable organic moiety R selected from the group containing alkyl, aryl, alkenyl, alkynyl, and cycloalkyl, all of which can be interrupted by –0- or —NH—, and
  where R can have at least one functional group Q selected from a group containing a hydroxy, ether, amino, monoalkylamino, dialkylamino, anilino, amide, carboxy, mercapto, alkoxy, aldehyde, alkylcarbonyl, epoxide, alkenyl, alkynyl, acrylic, acryloxy, methacrylic, methacryloxy, cyano and isocyano group, and
  a is 0, 1, 2 or 3, in particular 0, 1 or 2.

The modified resin and the resin layer resulting therefrom accordingly comprise at least two polymerisable or polymeric components, i.e. a formaldehyde resin (e.g. in the form of an aminoplastic resin such as a melamine-formaldehyde resin), and a further reactive polymer, and a silane compound. The resin layer is accordingly a three-component system. The resin layer can also be characterized as a modified (hybrid) resin layer.

For the purposes of the present application, it is clear to a person skilled in the art that all of the hydrolysis products of the silane compound of the general formula (I) can be represented by the general formula (II) $O_b X_c (OH)_d R_e SiO_{(4-b-c-d-e)/2}$, where b, c, d is 0, or 1 and e is 1, 2, or 3. The hydrolysis and/or condensation of the compounds of the general formula (I) is subject to, and influenced by, the reaction conditions, in particular by acidic reaction conditions during resin production.

The formaldehyde resin used in the present resin layer is preferably a formaldehyde resin that has not yet been completely hardened, and accordingly still has free OH groups and by way of example in the case of a melamine-formaldehyde resin also free $NH_2$ groups alongside the free OH groups. The formaldehyde resin used preferably comprises precondensates and oligomers. The degree of condensation of the formaldehyde resin used, in particular of melamine-formaldehyde resin, preferably corresponds to a water compatibility at 25° C. of 1:1.7-2.2 (resin:water ratio by volume).

The polymers used in the present resin layer preferably have a reactive group, for example carboxy group or OH group. The proportion of free OH groups in the polymer can be from 5 to 15% by weight, preferably from 8 to 12% by weight. If polyurethane is used as polymer, the content of free OH groups is by way of example 9.5% by weight.

The polymers are selected as required by the desired tactile property. If by way of example the intention is to achieve warm tactile properties in the case of realistic imitations of soft natural surfaces, for example wood surfaces, it is then preferable to use long-chain polymers which have no crosslinking or only a very small extent of crosslinking (i.e. polymers with a low degree of crosslinking). In the case of hard surfaces, for example stone effects or tile effects, with rather cold tactile properties, it is preferable to use polymers with a higher degree of crosslinking (but lower than melamine-formaldehyde resin).

The silane compound or silane-containing compound of the general formula (I) used in the present resin layer serves as compatibilizer between the formaldehyde resin and the polymer: the functional groups of the silane compound permit chemical bonding with the respective reactive groups of the formaldehyde resin and of the polymer, thus ensuring uniform and homogeneous mixing of the various components.

In one embodiment, the support material takes the form of a support sheet, paper layer, film layer or fabric layer. Examples of a paper layer that can be used are overlay papers, decorative papers and kraft papers.

Overlay papers are thin papers which typically have already been impregnated by a conventional melamine resin. There are also overlay paper obtainable in which abrasion-resistant particles, for example corundum particles, have already been mixed into the resin of the overlay in order to increase abrasion resistance.

Decorative papers are specialized papers for the surface-finishing of wood-based materials, and can provide a great variety of decorative effects: printed effects obtainable are not only the various typical wood structures but also other printed effects representing geometric shapes or artwork products. There is in fact no limit to the choice of effect. In order to ensure optimized printability, the paper used must have good smoothness and dimensional stability and must also be suitable for any required impregnation by synthetic resin.

Kraft papers have high strength and consist of pulp fibers with additions of starch, alum and size in order to achieve surface effects and increased strength.

In a preferred embodiment, the support material has been to some extent or completely impregnated by the modified resin, where the modified resin penetrates into the support material. Impregnation takes place in particular when paper layers are used as support material. The term "impregnation" here means that the paper layer has been completely or to some extent saturated by the modified resin made of formaldehyde resin, polymer and silane compound. This impregnation can by way of example be achieved in an impregnation bath, or by spreading, doctoring or spraying. The impregnation of the paper layer by the modified resin elastifies the paper layer, for example a decorative paper or overlay paper. It should be noted that the paper layer used can already have been pre-impregnated by a conventional resin (e.g. a melamine-formaldehyde resin), with the modified resin being applied additionally.

In another embodiment of the present support material, it is also possible that the resin layer does not penetrate into the support material but instead has been applied on the surface of the support material. This is in particular the case when a support sheet is used as support material. The arrangement here has the at least one resin layer on at least one surface, or one side, i.e. upper side and/or underside, of the support sheet. A single- or multilayer structure on the support material is understood here to be a surface.

In the case of a support sheet as support material, this is preferably a sheet made of a wood-based material, of plastic, of a wood-based-material/plastic blend, or of a composite material, in particular a particleboard, medium-density fiberboard (MDF), a high-density fiberboard (HDF), an oriented-strand board (OSB), or plywood sheet, a cement fiberboard, a plasterboard, and/or a WPC (wood-plastic composite) sheet. The layer thickness of the resin layer applied onto the support sheet is from 10 to 100 µm, preferably from 30 to 80 µm, with particular preference from 30 to 60 µm.

The surface of the support material can have been the first-treated, e.g. in the case of a wooden support sheet the surface can have been ground. In the case of a plastics support sheet, the surface can have been corona-treated.

There can also be at least one primer layer or at least one basecoat layer provided between support material surface (in particular in the case of a support sheet) and modified (hybrid) resin layer. It is preferable to use isocyanate-based compounds as primer, particular preference being given here to non-aromatic, aliphatic isocyanates, for example hexamethylene diisocyanate, isophorone diisocyanate, or prepolymers containing these isocyanates.

In a preferred embodiment, the present (hybrid) resin layer is not arranged on a preceding or underlying resin layer on a wood-based support sheet. In particular, the present (hybrid) resin layer is not arranged on a formaldehyde-containing resin layer such as a melamine-formaldehyde resin layer, located between support material (e.g. wood-based sheet) and (hybrid) resin layer.

In another embodiment, it is possible that the at least one resin layer has been provided on the upper side of the support material (i.e. on the side facing toward the user after installation of the support material), and that on the reverse side or underside of the support material, in particular if a wood-based sheet is used as support material, the arrangement has at least one sound-deadening layer. Wood-based sheets of this type are preferably used as sheet for a floor, for a wall, for a ceiling, or for furniture, or as chopping board.

If a paper layer is used as support material, it is preferable that, after coating and/or impregnation, these are used as decorative paper or overlay paper. Particular preference is given here to the use of the paper layers, impregnated by the modified resin, as part of a flexible laminate or skin, as explained in detail at a later stage below.

In another embodiment, the formaldehyde resin used in the at least one resin layer is a melamine-formaldehyde resin, a melamine-urea-formaldehyde resin or a urea-formaldehyde resin.

It is moreover possible that, in the at least one resin layer, poly(meth)acrylates are used as polyacrylate, aliphatic polyepoxides (polyalkyldiepoxides) or aromatic polyepoxides, for example biphenol-based polyepoxides, are used as polyepoxides, and aliphatic polyurethanes are used as polyurethanes. Long-chain silanols with a molecular length of at least 20 monomer units, preferably of at least 50 monomer units, are used as silanols.

The polymer is preferably used in the form of aqueous suspension, which is suitably stabilized.

In another embodiment, the quantitative proportion of polymer in the present resin layer or modified resin is at least 20% by weight, preferably at least 30% by weight, with particular preference at least 50% by weight. The mass ratio of formaldehyde resin and polymer is correspondingly in a range between 20:80, preferably 30:70, with particular preference 50:50.

The quantitative proportion of silane compound in the resin layer is at least 3% by weight, preferably 5% by weight, more preferably at least 10% by weight. In particular, preference is given to a quantitative proportion of from 10 to 20% by weight.

The moiety X described in the silane compound of the general formula (I) is preferably selected from a group containing fluoro, chloro, bromo, iodo, $C_{1-6}$-alkoxy, in particular methoxy, ethoxy, n-propoxy and butoxy, $C_{6-10}$-aryloxy, in particular phenoxy, $C_{2-7}$-acyloxy, in particular acetoxy or propionoxy, $C_{2-7}$-alkylcarbonyl, in particular acetyl, monoalkylamino or dialkylamino having $C_1$ to $C_{12}$, in particular $C_1$ to $C_6$. Particularly preferred hydrolysable groups are $C_{1-4}$ alkoxy groups, in particular methoxy and ethoxy.

In a preferred embodiment, X is selected from a group containing OH, $C_{1-6}$-alkoxy, in particular methoxy, ethoxy, n-propoxy and butoxy.

The non-hydrolysable moiety R is preferably selected from a group containing $C_1$-$C_{30}$-alkyl, in particular $C_5$-$C_{25}$-alkyl, $C_2$-$C_6$-alkenyl, $C_2$-$C_6$-alkynyl and $C_6$-$C_{10}$-aryl.

In one embodiment, the non-hydrolysable moiety R is selected from the group containing methyl, ethyl, n-propyl, isopropyl, n-butyl, sec-butyl, tert-butyl, pentyl, hexyl, cyclohexyl, vinyl, 1-propenyl, 2-propenyl, butenyl, acetylenyl, propargyl, phenyl and naphthyl.

The expression "non-hydrolysable organic moiety" here means an organic moiety which in the presence of water does not lead to the formation of an $NH_2$ group or OH group linked to the Si atom.

The at least one functional group Q that can be present in the organic non-hydrolysable moiety R preferably comprises an epoxide group, in particular a glycidyl group or glycidyloxy group, an amine group or an isocyano group.

The suitable functional group Q is preferably selected as required by the polymer used. In the case of use of a polyacrylate as polymer, therefore, a silane compound having a methacrylic or methacryloxic group as functional group Q is advantageous. With use of a polyepoxide as polymer, a silane compound having an epoxy group as functional group will preferably be used.

In a particularly preferred embodiment, the following are used as silanes: tetraethylorthosilane or methyltriethoxysilane, or else gamma-isocyanatopropyltriethoxysilane, or a glycidyloxypropyltriethoxysilane.

As described, the non-hydrolysable moiety R can have at least one functional group Q. The moiety R can moreover also have substitution by further moieties. The following moieties or substituents can be present here: halogen, hydroxy, protected hydroxy, oxo, protected oxo, $C_3$-$C_7$-cycloalkyl, bicyclic alkyl, phenyl, naphthyl, amino, protected amino, monosubstituted amino, protected monosubstituted amino, disubstituted amino, guanidine, protected guanidine, a heterocyclic ring, a substituted heterocyclic ring, imidazolyl, indolyl, pyrrolidinyl, $C_1$-$C_{12}$ alkoxy, $C_1$-$C_{12}$-acyl, $C_1$-$C_{12}$-acyloxy, acryloyloxy, nitro, carboxy, protected carboxy, carbamoyl, cyano, methylsulfonylamino, thiol, $C_1$-$C_{10}$-alkylthio and $C_1$-$C_{10}$-alkylsulfonyl. The substituted alkyl groups, aryl groups, and alkenyl groups can have one or more identical or different substituents, preferably 1 or 2.

The term "alkynyl" as used here means a moiety of the formula R—C≡C—, in particular an "$C_2$-$C_6$-alkynyl". Examples of $C_2$-$C_6$-alkynyl moieties include: ethynyl, propynyl, 2-butynyl, 2-pentynyl, 3-pentynyl, 2-hexynyl, 3-hexynyl, 4-hexynyl, vinyl, and also di- and tri-ynes involving straight and branched alkyl chains.

The term "aryl" as used here means aromatic hydrocarbons, for example phenyl, benzyl, naphthyl, or anthryl. Substituted aryl groups are aryl groups that can have one or more substituents, as defined above.

The term "cycloalkyl" comprises the groups cyclopropyl, cyclobutyl, cyclopentyl, cyclohexyl and cycloheptyl.

In another embodiment, the number of resin layers arranged on the support material is more than one, preferably two, three or four. In the case of more than one resin layer, the composition of the resin layers can be identical or different. In the case of a multilayer structure, the individual resin layers can accordingly consist of various hybrid resins, and in this way it is possible to establish different properties.

In a more advanced embodiment of the present support material, it is possible that nanoparticles of size below 500 nm are used in the resin layer. The size of the nanoparticles used is from 2 to 400 nm, preferably from 2 to 100 nm, with particular preference from 2 to 50 nm. The particles can in particular be of oxidic, hydroxic or oxyhydroxidic type, and can be produced by way of various processes, for example ion exchange process, plasma process, sol-gel process, milling, or else flame deposition. In a preferred embodiment, particles based on $SiO_2$, $Al_2O_3$, $ZrO_2$, $TiO_2$, SnO are used.

It is also possible that the at least one resin layer comprises fillers, wetting agents or further additives.

The fillers here are selected from a group containing fibers, wear-inhibiting materials, conductive substances, heat-conductive materials, materials for adjusting tactile properties and materials for reducing impressions, e.g. fingerprints.

Wear-inhibiting particles can be added to the resin layer in order to improve the abrasion/wear resistance of the resin layer. These can inter alia consist of aluminum oxide (corundum), carbides, for example boron carbides, silicon carbides, silicon dioxide and/or glass spheres. It is important here that the size of the particles is appropriate to the quantity applied of the resin layer. The size of the wear-inhibiting particles can be in the range from 1 to 20 μm, preferably from 5 to 15 μm, with particular preference from 7 to 12 μm. In the case of a resin layer thickness of, for example, from 10 to 12 μm, the particle sizes of the wear-inhibiting materials should not exceed from 8 to 10 μm.

Other materials that can be present in the resin layer, alongside the abrasion-resistant particles, are also further fillers or additives, for example natural or synthetic fibers, flame retardants and/or luminescent, antibacterial substances.

Suitable flame retardants can be selected from the group containing phosphates, borates, in particular ammonium polyphosphate, tris(tribromoneopentyl) phosphate, zinc borate or boric acid complexes of polyhydric alcohols.

Fluorescent or phosphorescent substances can be used as luminescent substances, in particular zinc sulfite and alkali metal aluminates, and silver compounds can be used as antibacterial. The luminescent substances can be applied onto the surface in geometric shapes by use of templates. Incorporation of these colorants into the surface of wood-based sheets that can be used as floor panels or wall panels for example in enclosed rooms can thus provide information concerning escape routes and escape direction in the event of lighting-system failure.

The conductive substances can be selected from the group containing carbon black, carbon fibers and metal powder, and in particular carbon nanotubes, or salts. It is also possible to use combinations of these substances.

The natural or synthetic fibers used are preferably selected from the group containing wood fibers, cellulose fibers, partially bleached cellulose fibers, wool fibers, hemp fibers and organic or inorganic polymer fibers.

Particularly preferred fillers or additives are:
cellulose fibers for influencing tactile properties (thermal conductivity, surface structure), acoustic properties and optical properties;
hollow spheres for influencing thermal conductivity;
groundwood for influencing tactile properties (thermal conductivity, surface structure), acoustic properties and optical properties;
corundum to increase scratch resistance;
organic particles (e.g. PUR microspheres of various size) or inorganic particles (e.g. solid $Al_2O_3$ or $SiO_2$ particles) for further adjustment of tactile properties;
various types of sand;
conductive particles for construction of an antistatic surface; and/or
silicones to improve the anti-fingerprint property.

Wetting agents and/or dispersion additives can be added to improve the dispersion of the fillers in the resin layer.

Typical wetting agents are surfactants, fatty acids or derivatives of polysiloxanes. These wetting agents can also be used for the saturation of papers.

The at least one resin for the coating and/or impregnation of the present support material is produced in a process comprising the following steps:
provision of at least one formaldehyde resin,
addition of at least one silane compound of the general formula (I) to the at least one formaldehyde resin;
provision of a suspension of at least one polymer selected from a group containing polyacrylates, polyepoxides, polyesters, and polyurethanes;
addition of the polymer suspension to the mixture of formaldehyde resin and silane compound of the general formula (I); and
addition of at least one catalyst, in particular of a hydrolytically active compound, to the mixture.

Compounds preferably used as hydrolytically active compounds are those having acidic or basic/alkaline reaction.

The following can be used as compounds having acidic reaction: substances selected from the group containing saturated or unsaturated mono- and polycarboxylic acids, in particular octadecanoic acid, acrylic acid, methacrylic acid or crotonic acid, ss-dicarbonyl compounds, in particular acetylacetone, amino acids, organic derivatives of sulfuric acid, for example alkyl sulfates or fatty alcohol sulfates, esters of sulfonic acids, for example alkylsulfonic acids and alkylsulfonates, organic phosphates, for example (alkyl) ethoxylated phosphoric acids and lecithin, polyacids, in particular polyhydroxyaspartic acid and polyhydroxystearic acid. Other examples are 1H,1H-pentadecafluorooctanol, octanol, stearic acid, oleic acid, hexanoyl chloride, methyl hexanoate, hexyl chloride and nonafluorobutyl chloride.

The compounds having alkaline reaction are preferably selected from the group containing mono- and polyamines, in particular methylamine, ethylenediamine, ammonia, and alkali metal hydroxides and alkaline earth metal hydroxides, in particular NaOH.

In a variant of the above process, the resin is additionally mixed with the abovementioned wetting agents, fillers and/or further additives.

As already stated above, it is desirable to use a paper layer provided with, in particular impregnated with, the modified resin as support material in a flexible laminate.

Correspondingly, a flexible laminate (or skin) is also provided which comprises at least one support material provided with the modified resin, where the support material is a paper layer impregnated by the modified resin, in particular a kraft paper layer, or a decorative paper layer.

In one embodiment of the present laminate, the following are provided in addition to the at least one paper layer impregnated by the modified resin: at least one paper layer not impregnated by the modified resin, at least one transparent paper layer (parchmentized paper) and/or at least one plastics film layer. The use and number of paper layers impregnated by the modified resin and of further paper layers and film layers in the laminate, and the layer structure of the laminate, depends in particular on the subsequent use. The various layers can be present repeatedly in the laminate structure, alternate and/or swap their position. However, it is essential that at least one layer coated by and/or impregnated by the modified resin is present in the laminate.

Another term used for the transparent paper used in the laminate here is parchmentized paper. Parchmentized paper is a transparent paper which is produced from fine-particle pulp and is substantially greaseproof, but not waterproof. It acquires its high transparency through a very high level of satinization.

The plastics film layer used in the laminate consists of polymers, in particular of polypropylene (PP), polyethylene (PE), polyethylene terephthalate (PET), thermoplastic polyurethane (TPU) or polyurethane.

As already indicated, the present laminate can have a plurality of, preferably at least two, paper layers impregnated by the modified resin, and also a plurality of further paper layers or of film layers.

If two or more paper layers impregnated by the modified resin are used, the compositions of the modified resins for the individual paper layers can be identical or different. The quantity of the modified resin can vary from 10% to 50% by weight (based on the paper layer), preferably from 20 to 40% by weight. A point requiring attention here is that the paper layers that form the subsequent visible surface of a support sheet, e.g. wood-based sheet, which is pressed by the laminate comprise a smaller quantity of modified resin (e.g. 10% by weight) than paper layers that are not visible during the subsequent use of the laminate on a support sheet (e.g. 45% by weight). In other words, the closer the modified layer is to the subsequent surface, the smaller the quantity of modified resin that can be used, because said use could lead to visual defects (e.g. transparency), and "cloudy/milky" visual effects could arise.

Accordingly, the present laminate can by way of example have at least one overlay paper layer impregnated by the modified resin and at least one kraft paper layer impregnated by the modified resin, or at least one decorative paper layer impregnated by the modified resin and at least one kraft paper layer impregnated by the modified resin.

In a first variant of the present flexible laminate, the following are provided: at least one overlay paper layer impregnated by the modified resin, at least one decorative paper layer not impregnated by the modified resin, and at least one kraft paper layer impregnated by the modified resin.

In another variant of the present flexible laminate, the following are provided: at least one overlay paper layer impregnated by the modified resin, at least one decorative paper layer impregnated by the modified resin, and at least one kraft paper layer impregnated by the modified resin.

In an even more advanced variant of the present flexible laminate, the laminate comprises at least one overlay paper layer impregnated by the modified resin, at least one decorative paper layer not impregnated by the modified resin, at least one, preferably at least two, transparent paper layer(s) (parchmentized paper), and at least one kraft paper layer impregnated by the modified resin. There can optionally be at least one counterbalancing material provided. This type of layer structure can be composed of the following, from the top downward: an overlay paper layer impregnated by modified resin, a decorative paper layer not impregnated by the modified resin, a parchmentized paper layer, a kraft paper layer impregnated by the modified resin, a parchmentized paper layer and optionally a counterbalancing material.

In another variant, the laminate comprises at least one overlay paper layer not impregnated by the modified resin, at least one decorative paper layer impregnated by the modified resin, at least one, preferably at least two, transparent paper layer(s) (parchmentized paper), and at least one kraft paper layer impregnated by the modified resin. This type of layer structure can be composed of the following, from the top downward: an overlay paper layer not impregnated by the modified resin, a decorative paper layer impregnated by the modified resin, a parchmentized paper layer, a kraft paper layer impregnated by the modified resin, a parchmentized paper layer, a kraft paper layer impregnated by the modified resin, and optionally a counterbalancing material.

In yet another variant, the laminate comprises at least one overlay paper layer impregnated by the modified resin, at least one decorative paper layer not impregnated by the modified resin, at least one plastics film layer (e.g. a PET layer), and at least one, preferably two, kraft paper layer(s) impregnated by the modified resin. On the plastics film layer there can additionally be, on one or both sides respectively, a primer (e.g. based on isocyanate) provided. This type of layer structure can be composed of the following, from the top downward, an overlay paper layer impregnated by the modified resin, a decorative paper layer not impregnated by the modified resin, a plastics film layer, two successive kraft paper layers impregnated by the modified resin, and optionally a counterbalancing material.

The counterbalancing material mentioned in the above embodiments of the laminate is in each case included in the event of requirement, if this is necessary.

The thickness of the present laminate or skin is from 0.1 to 3 mm, preferably from 0.1 to 2 mm.

The present support material is produced in a process comprising the following steps:
    production of a modified resin described above;
    application of the resin onto the at least one support material, and
    pressing of the resin-coated support material in a hot press.

For the production of the laminate, the following process steps are used after production of the modified resin:
    provision of at least one paper layer impregnated by the modified resin,
    provision of at least one paper layer not impregnated by the modified resin, at least one transparent paper layer, and/or one plastics film layer,
    production of a layer system made of a paper layer impregnated by the resin, a paper layer not impregnated by the resin, a transparent paper layer, and/or a plastics film layer, and
    pressing of the layer system in a hot press, in particular in a continuous press or batch press (e.g. short-cycle press) or a twin-belt press.

The pressed laminate (or skin) is then placed onto, or laminated onto, a suitable support material, in particular a support sheet. The lamination is achieved with the use of at least one adhesive, in particular a polyurethane adhesive or a thermoplastic adhesive. This usually takes place in a lamination system. Support sheet and laminate thereon are finally pressed together.

The pressing of the resin layer and, respectively, the laminate with the support material takes place under conventional conditions (cycle time, press temperature): the resin mixture can be hardened under a pressure of from 2 to 8 MPa and at a temperature of from to 120 to 250° C., with formation of the surface layer on the support material.

A variant of the process for the production of the support material provides that, before the pressing of the support material with the resin layer, at least one release agent (e.g. polysiloxanes such as polymethylsiloxane, or fluorine-modified plastics such as Teflon) is applied onto the resin layer, into the resin layer, and/or onto the surface of the press platen.

Another modification of the resin layer and, respectively, laminate provided on the support material can consist in the introduction of structures, e.g. depressions or elevations, into a resin layer. These structures can be produced in the resin layer by structured applicator rolls which can if necessary and/or desired be matched to the decorative effects used. Methods of this type for the structuring of surfaces are known by way of example from EP 2 251 501 B1.

With the present invention it is now possible to provide sheets with surfaces that are robust but at the same time resilient, have pleasant tactile properties, and provide realistic imitations of natural surfaces.

By way of example, a sheet is firstly provided that consists of a support sheet, onto the surface of which the modified resin layer has been applied and pressed (optionally onto a primer or basecoat).

In another example, a sheet is provided that consists of a support sheet with laminate arranged and pressed thereon.

In both cases, it is preferable that the support sheet used is a sheet consisting of a wood-based material, of plastic, of a wood-based material/plastic blend, or of a composite material, in particular a particleboard, medium-density fiberboard (MDF), a high-density fiberboard (HDF), an oriented-strand board (OSB), or plywood sheet, a cement fiberboard, a plasterboard, and/or a WPC (wood-plastic composite) sheet.

BRIEF DESCRIPTION OF THE DRAWINGS

The invention is explained in more detail below on the basis of a number of inventive examples, with reference to the figures, which show.

DESCRIPTION OF THE INVENTION

INVENTIVE EXAMPLE 1: DEVELOPMENT OF A SURFACE PROVIDING A REALISTIC IMITATION OF WOOD ON MDF/HDF 50 g of a melamine resin mixture (without initiator) are heated to 50° C. 2.03 g of tetraethyl orthosilicate are then added thereto. 50 g of an aqueous carboxylated polyacrylate from BASF (Acronal DS 3591) are moreover added thereto, with stirring. After addition of 0.25 g of para-toluenesulfonic acid as catalyst, a hydrolysis and condensation reaction is initiated. The mixture is stirred for a further 30 minutes.

Thermal conductivity is adjusted by adding 3 g of hollow beads (K20 from 3M). Acronal DS 3591 is used here to increase resilience.

The ready-to-use hybrid resin is stable in storage for about one day, and can then be further processed in the same way as conventional melamine resins.

The hybrid resin is applied onto MDF/HDF, which has been surface-treated and basecoated, and is pressed. The surface of the MDF/HDF has warm tactile properties providing a realistic imitation of wood.

Figure 1:
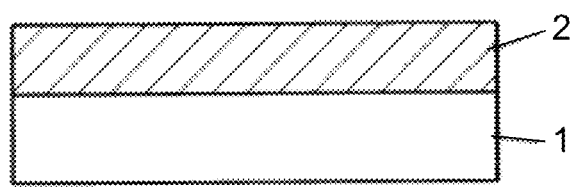
In FIG. 1, MDF/HDF, on the upper side of which there is a modified resin layer provided.

FIG. 1 depicts a typical layer structure made of MDF/HDF 1 with modified resin layer 2 arranged on the surface.

INVENTIVE EXAMPLE 2: DEVELOPMENT OF A STONE-TYPE SURFACE ON MDF/HDF 50 g of a melamine resin mixture (without initiator) are heated to 50° C. 1.78 g of methyltriethoxysilane are then added thereto. 50 g of U 9380 from Alberdingk are moreover added thereto, with stirring. After addition of 0.2 g of sulfuric acid (1 molar) as catalyst, a hydrolysis and condensation reaction is initiated. The mixture is stirred for a further 55 minutes.

Hardness and thermal conductivity, and also abrasion resistance, is adjusted by adding 7 g of quartz sand and 3 g of corundum (ZWSK 220, Treibacher). The polyurethane added reduces resilience.

The ready-to-use hybrid resin is stable in storage for about one day, and can then be further processed in the same way as conventional melamine resins.

The hybrid resin is applied onto MDF/HDF, which has been surface-treated and basecoated, and is pressed. The surface of the MDF/HDF has cold, stone-like tactile properties.

INVENTIVE EXAMPLE 3: FIRST EMBODIMENT OF A LAMINATE

Figure 2:
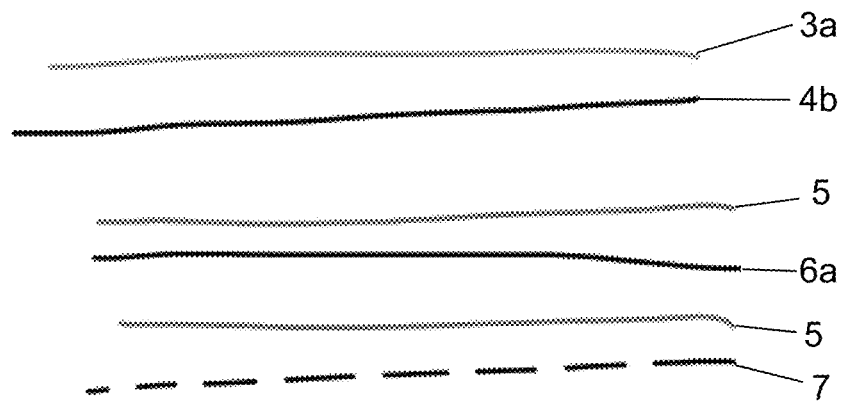
In FIG. 2, a first embodiment of the flexible laminate.

FIG. 2 shows the layer structure of a first embodiment of the laminate of the invention.

The layer structure is composed of the following, from the top downward: an overlay paper layer 3a impregnated by modified resin—a decorative paper layer 4b not modified by the modified resin, with corundum—a parchmentized paper layer 5—a kraft paper layer 6a impregnated by the modified resin a parchmentized paper layer 5, and optionally a counterbalancing material 7.

The modified resin used for the impregnation of the various paper layers in principle comprises a composition similar to resin compositions mentioned in inventive examples 1 and 2.

50 g of a melamine resin mixture (without initiator) are heated to 50° C. 1.78 g of methyltriethoxysilane are then added thereto.

50 g of a polyurethane (U058) from Alberdingk are moreover added thereto, with stirring. After addition of 0.2 g of sulfuric acid (1 molar) as catalyst, a hydrolysis and condensation reaction is initiated. The mixture is stirred for a further 55 minutes.

The modified resin is used for the impregnation of the overlay paper layer (10% by weight of resin) and for the impregnation of the kraft paper layer (45% by weight).

The impregnated and non-impregnated paper layers are then mutually superposed in the abovementioned sequence, and pressed together to give a laminate. The laminate is by way of example laminated onto HDF with thickness 4.5 mm and swelling amounting to 5% edge swelling in accordance with EN 13329 (Q5), and is further processed to give a floor panel.

INVENTIVE EXAMPLE 4: SECOND EMBODIMENT OF A LAMINATE

Figure 3:
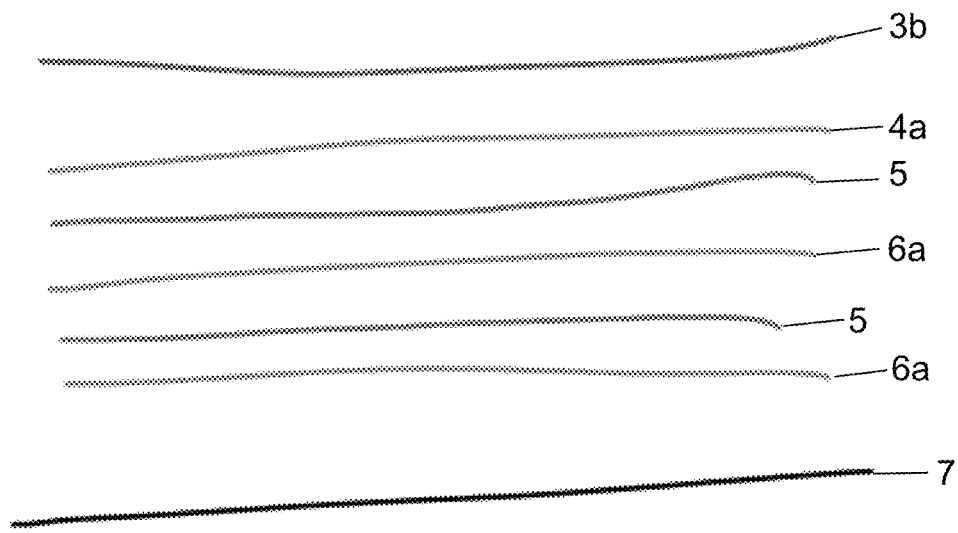
In FIG. 3, a second embodiment of the flexible laminate; and
In FIG. 4, a third embodiment of the flexible laminate.

FIG. 3 shows the layer structure of a second embodiment of the laminate of the invention.

The layer structure is composed of the following, from the top downward: an overlay paper layer 3b not impregnated by the modified resin—a decorative paper layer 4a impregnated by the modified resin—a parchmentized paper layer 5—a kraft paper layer 6a impregnated by the modified resin—a parchmentized paper layer 5—a kraft paper layer 6 impregnated by the modified resin, and optionally a counterbalancing material 7.

50 g of a melamine resin mixture (without initiator) are heated to 50° C. 2.03 g of tetraethyl orthosilicate are then added thereto. 50 g of a polyurethane (U058) from Alberdingk are moreover added thereto, with stirring. After addition of 0.25 g of para-toluenesulfonic acid as catalyst, a hydrolysis and condensation reaction is initiated. The mixture is stirred for a further 30 minutes.

The modified resin is used for the impregnation of the decorative paper layer (15% by weight of resin) and for the impregnation of the kraft paper layer (45% by weight).

The impregnated and non-impregnated paper layers are then mutually superposed in the abovementioned sequence, and pressed together to give a laminate. The laminate is by way of example laminated onto MDF, and can be used as sheet for furniture.

INVENTIVE EXAMPLE 5: THIRD EMBODIMENT OF A LAMINATE

Figure 4:
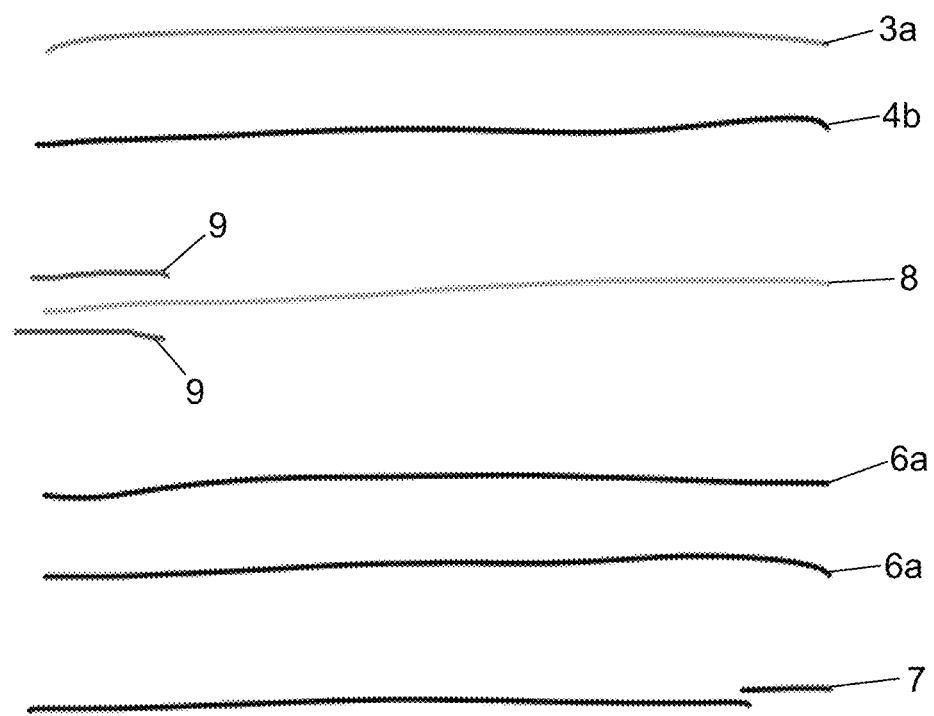

FIG. 4 shows the layer structure of a third embodiment of the laminate of the invention.

This type of layer structure can be composed of the following, from the top downward: an overlay paper layer 3a impregnated by the modified resin—a decorative paper layer 4b not impregnated by the modified resin—a PET layer 8 as plastics film layer, there being a primer 9 (e.g. based on the isocyanate) provided respectively on the two sides of the plastics film layer—two successive kraft paper layers 6a impregnated by the modified resin, and optionally a counterbalancing material 7.

50 g of a melamine resin mixture (without initiator) are heated to 50° C. 1.78 g of tetramethoxyilane are then added thereto. 50 g of a polyurethane (U058) from Alberdingk are moreover added thereto, with stirring. After addition of 0.2 g of sulfuric acid (1 molar) as catalyst, a hydrolysis and condensation reaction is initiated. The mixture is stirred for a further 55 minutes.

The modified resin is used for the impregnation of the overlay paper layer (10% by weight of resin) and for the impregnation of the kraft paper layer (45% by weight).

The impregnated and non-impregnated paper layers are then mutually superposed in the abovementioned sequence with the PET layer and pressed together to give a laminate.

What is claimed is:

1. A support material comprising:
   an overlay paper layer partially or completely impregnated with a modified resin,
   wherein
   the modified resin comprises:
   at least one formaldehyde resin;
   at least one polymer selected from the group consisting of polyacrylates, polyepoxides, polyesters, polyurethanes and long-chain silanols, wherein an amount of polymer in the modified resin is at least 20 wt %; and
   at least one silane-containing compound of the general formula $R_aSiX_{(4-a)}$ and/or a hydrolysis product thereof, where
   X is alkoxy,
   R is an alkyl, and
   a is 0, 1, 2 or 3,
   wherein the overlay paper layer partially or completely impregnated with the modified resin is provided as an exposed outermost layer in a laminate with at least one paper layer not impregnated with the modified resin, at least one kraft paper layer partially or completely impregnated with the modified resin, and at least one transparent paper layer, and an upper surface of the partially or completely impregnated overlay paper layer is exposed.

2. The support material as claimed in claim 1, wherein the at least one formaldehyde resin is a melamine-formaldehyde resin, a melamine-urea-formaldehyde resin, or a urea-formaldehyde resin.

3. The support material as claimed in claim 1, wherein the polyacrylate is a poly(meth)acrylate, the polyepoxide is an aliphatic polyepoxide (polyalkyldiepoxide) or an aromatic polyepoxide, and the polyurethane is an aliphatic polyurethane.

4. The support material as claimed in claim 1, wherein the mass ratio of formaldehyde resin and polymer is from 20:80 to 80:20.

5. The support material as claimed in claim 1, wherein the modified resin comprises nanoparticles of a size less than 500 nm, fillers, wetting agents, or other additives.

6. The support material as claimed in claim 1, wherein a is 0, 1, or 2.

7. A sheet comprising a support sheet with at least one support material according to claim 1 provided on at least one surface of the support sheet.

8. The sheet of claim 7, wherein the support sheet is a wood-based material, a plastic, or a composite material.

9. The sheet of claim 8, wherein the composite material is a particleboard, a medium-density fiberboard (MDF), a high-density fiberboard (HDF), an oriented-strand board (OSB), a plywood sheet, a cement fiberboard, a plasterboard, or a wood-plastic composite sheet.

10. The support material of claim 1, further comprising a resin layer comprising the modified resin, the resin layer coating at least one surface of the overlay paper layer partially or completely impregnated by the modified resin.

11. A support material comprising:
    an overlay paper layer partially or completely impregnated with a modified resin,
    wherein
    the modified resin comprises:
    at least one formaldehyde resin;
    at least one polymer selected from the group consisting of polyacrylates, polyepoxides, polyesters, polyurethanes and long-chain silanols, wherein an amount of polymer in the modified resin is at least 20 wt %; and
    at least one silane-containing compound of the general formula $R_aSiX_{(4-a)}$ and/or a hydrolysis product thereof, where
    X is alkoxy,
    R is an alkyl, and
    a is 0, 1, 2 or 3,
    wherein the overlay paper layer partially or completely impregnated with the modified resin is provided as an exposed outermost layer in a laminate with at least one paper layer not impregnated with the modified resin, the at least one paper layer not impregnated with the modified resin is a decorative paper layer, and the laminate further comprises at least one kraft paper layer impregnated with the modified resin, and an upper surface of the partially or completely impregnated overlay paper layer is exposed.

12. The support material of claim 11, wherein the laminate further comprises at least one transparent paper.

13. The support material of claim 11, wherein the laminate comprises two transparent paper layers, and, optionally, a backing.

14. The support material of claim 13 comprising the following layer structure in the following order: the overlay paper layer impregnated with the modified resin, a decorative paper layer not impregnated with the modified resin, one transparent paper layer, the at least one kraft paper layer impregnated with the modified resin, another transparent paper layer, and, optionally, the backing comprising a counterbalancing material.

15. A support material comprising:
    an overlay paper layer partially or completely impregnated with a modified resin,
    wherein
    the modified resin comprises:
    at least one formaldehyde resin;
    at least one polymer selected from the group consisting of polyacrylates, polyepoxides, polyesters, polyurethanes and long-chain silanols, wherein an amount of polymer in the modified resin is at least 20 wt %; and
    at least one silane-containing compound of the general formula $R_aSiX_{(4-a)}$ and/or a hydrolysis product thereof, where
X is alkoxy,
R is an alkyl, and
a is 0, 1, 2 or 3,
wherein the overlay paper layer partially or completely impregnated with the modified resin is provided as an exposed outermost layer in a laminate with at least one kraft paper layer not impregnated with the modified resin and at least one transparent paper layer, and an upper surface of the partially or completely impregnated overlay paper layer is exposed.

16. The support material as claimed in claim 15, wherein the formaldehyde resin is a melamine-formaldehyde resin, a melamine-urea-formaldehyde resin, or a urea-formaldehyde resin and/or the polyacrylate is a poly(meth)acrylate, the polyepoxide is an aliphatic polyepoxide (polyalkyldiepoxide) or an aromatic polyepoxide, and the polyurethane is an aliphatic polyurethane.

17. A sheet comprising a support sheet with at least one support material according to claim 15 provided on at least one surface of the support sheet.

18. The sheet of claim 17, wherein the support sheet is a wood-based material, a plastic, or a composite material.

19. The support material as claimed in claim 11, wherein the formaldehyde resin is a melamine-formaldehyde resin, a melamine-urea-formaldehyde resin, or a urea-formaldehyde resin and/or the polyacrylate is a poly(meth)acrylate, the polyepoxide is an aliphatic polyepoxide (polyalkyldiepoxide) or an aromatic polyepoxide, and the polyurethane is an aliphatic polyurethane.

20. A sheet comprising a support sheet with at least one support material according to claim 11 provided on at least one surface of the support sheet.

21. The sheet of claim 20, wherein the support sheet is a wood-based material, a plastic, or a composite material.

* * * * *